United States Patent [19]

Murakami

[11] Patent Number: 5,441,133
[45] Date of Patent: Aug. 15, 1995

[54] HYDRAULIC DAMPER HAVING LEAF VALVE STOPPER

[75] Inventor: Tokoharu Murakami, Kakamigahara, Japan

[73] Assignee: Kayaba Kogyo Kabushiki Kaisha, Tokyo, Japan

[21] Appl. No.: 89,783

[22] Filed: Jul. 9, 1993

Related U.S. Application Data

[63] Continuation-in-part of Ser. No. 882,910, May 14, 1992, abandoned.

[51] Int. Cl.⁶ .............................................. F16F 9/34
[52] U.S. Cl. ................................. 188/322.15; 188/317
[58] Field of Search .................. 188/322.15, 314, 315, 188/318, 319, 317, 275; 137/493.8

[56] References Cited

U.S. PATENT DOCUMENTS

| | | | |
|---|---|---|---|
| 4,352,417 | 10/1982 | Stinson | 188/322.15 |
| 4,460,074 | 7/1984 | Müller et al. | 188/322.15 |
| 4,484,669 | 11/1984 | Kato | 188/322.15 |
| 4,624,347 | 11/1986 | Mourray | 188/317 |
| 4,721,130 | 1/1988 | Hayashi | 188/322.15 |
| 4,809,829 | 3/1989 | Hummel et al. | 188/322.15 |
| 4,964,493 | 10/1990 | Yamaura et al. | 188/322.15 |

*Primary Examiner*—Matthew C. Graham
*Attorney, Agent, or Firm*—McGlew and Tuttle

[57] ABSTRACT

This invention relates to a hydraulic damper arranged between a vehicle chassis and a wheel axle for use in attenuating a vibration transmitted from a road surface. A leaf valve and a main valve are provided at an inner seat and an outer seat having different heights to each other arranged at outlet ports of a piston in such a way as they may be opened or closed, the leaf valve is supported at its base end by a stopper provided with a tapered or curved surface at is upper surface. The main valve is arranged in such a way as it may be floated up and down in opposition to the outer seat. A load of the main valve is set only with an inertia of a spring, so that an attenuation force can be stabilized, and the leaf valve is supported by the tapered or curved surface of the stopper when flexed, resulting in that no cracks are generated.

20 Claims, 4 Drawing Sheets

HYDRAULIC DAMPER HAVING LEAF VALVE STOPPER

This application is a continuation in part of application Ser. No. 07/882,910, filed May 14, 1992, now abandoned.

FIELD OF THE INVENTION

This invention relates to a hydraulic damper installed between a chassis body of a vehicle and a wheel axle so as to damp vibrations transmitted from a road surface.

BACKGROUND OF THE INVENTION

A similar type of hydraulic damper, has been developed to provide a system as shown in FIG. 6, for example.

This type of hydraulic damper is constructed such that a piston rod 3 is movably inserted into a cylinder 1 through a piston 2 acting as a partition wall member. The piston 2 defines two hydraulic chambers, i.e. an upper hydraulic chamber 4 and a lower hydraulic chamber 5 in the cylinder 1. The two hydraulic cylinders 4 and 5 communicate with each other through an extension port 6 and a compression port 7 arranged in the piston 2.

At an outlet side of the extension port 6 there are formed two seats (a) and (b) having different heights to each other. The seat (a) is provided with a leaf valve 8 for a fine slow speed supported by an intermediate seat 17 in such a way as it may be opened or closed. The other seat (b) is provided with a cutout leaf valve 9 in such a way as it may be opened or closed. Below the cutout leaf valve 9 there is arranged a sub-leaf valve 10 supported by a valve stopper biased by a spring 14.

At the upper outlet seat (c) of the compression port 7, a cutout leaf valve 12 is formed with a recess 15 and a communication hole 16, and a leaf valve 11 in such a way as they may be opened or closed.

In case of an extending operation, hydraulic oil in the upper hydraulic chamber 4 flows into the lower hydraulic chamber 5. At the fine slow speed range, the leaf valve 8 is opened to cause the hydraulic oil to flow out through the cutout at an outer circumference of the cutout valve 9. In turn, at the intermediate and high speed ranges showing an increased flow rate, the leaf valve 8 is flexed downwardly and at the same time the cutout leaf valve 9 is flexed by an amount where set loads of the sub-leaf valve 10 and a spring 14 are balanced with the flow rates so as to generate an attenuation force. However, in case of the aforesaid hydraulic damper, as the set load of the sub-leaf valve 10 under an opened valve state, a plate thickness of the sub-leaf valve 10 itself and a step difference between the seats (a) and (b) are accumulated in addition to the set load of the spring 14, an initial load of the sub-leaf valve 10 is high and a disturbance of attenuation force caused by the plate thickness and a tolerance of the step difference is increased.

Also in the example shown in FIG. 6, the fluid will bend the leaf valve 8 until the leaf valve 8 contacts the leaf valve 9. When leaf valve 9 bends, leaf valve 8 can then bend farther. This further effects and complicates the calculation of the attenuation force.

In addition, a repetitive flexing of the leaf valve 8 may cause stress to be concentrated at a location near the intermediate seat 17 and a crack caused by a buckling action may be generated.

In U.S. Pat. No. 4,964,493 to Yamura et al., describes an upper disc valve 138 with a stopper plate 144. A lower disc valve 140 abuts, and is biased against a complete side of this stopper plate 144. Fluid flowing past the upper disc valve 138 only initially can come into contact with a small outer periphery of the lower disc valve 144. It may be possible that after the lower disc valve 140 begins to open the fluid can come into larger contact with the lower disc valve 140. This changing of the fluid contact area changes the amount of force that the lower disc valve 140 receives from the fluid, therefore changing the amount that the lower disc valve 140 opens and the attenuation force. The opening of the lower disc valve 140 is therefore not smooth and correspondingly so is not the attenuation. The attenuation force being very difficult to calculated because of all these changes.

In the example shown in FIG. 6, the fluid flowing past leaf valve 8 also only acts on an outer periphery of leaf valve 9, especially when the leaf valve 8 is fully open. The amount of area of the leaf valve 9 that is in contact with the fluid can vary depending on the position of the leaf valve 8. Again this causes changes in the amount of opening of the leaf valve 9 and changes in the attenuation force. A smooth attenuation force is then prevented by this change in fluid contact area.

SUMMARY AND OBJECTS OF THE INVENTION

Thus, it is an object of this invention to provide a hydraulic damper in which the influence of inertia of a valve other than the spring is not applied.

It is another object of this invention to provide a hydraulic damper in which there is no disturbance in an attenuation force and a smooth stabilized state can be attained.

It is a still further object of this invention to provide a hydraulic damper in which no cracks are generated at the leaf valve even if the leaf valve is repetitively flexed.

In order to accomplish the aforesaid objects, this invention may provide a hydraulic damper in which two hydraulic chambers are defined through a partition wall member, the two hydraulic chambers are communicated to each other through ports arranged in the partition wall member. An outlet of the port is provided with an inner seat and an outer seat having different heights to each other. The inner seat is provided with a low speed leaf valve, and a main valve opposing to the outer seat is arranged at the downstream side of the low speed leaf valve. This invention has a feature that the aforesaid leaf valve is supported at its base end by a valve stopper formed with a gradually continuously tapered or curved surface to gradually bend the leaf valve into a fully flexed state. The gradually tapered or curved surface of the valve stopper for the leaf valve substantially evenly supports the leaf valve when the leaf valve is fully flexed.

The main valve is constituted by a cutout valve formed with a cutout at its outer circumference so as to be oppositely faced against the outer seat or the outer seat is formed with an orifice. Then the main valve is arranged in such a way as it may oppose against this orifice and float up and down thereto. The outer seat and the main valve are positioned spaced in the downstream direction from a downstream side of the valve stopper of the low speed leaf valve. This allows an intermediate chamber to form between the downstream side of the valve stopper and the full upstream side of the main valve. This intermediate chamber is present during all positions of the low speed leaf valve and the main valve, and the amount of the main valve in contact with the fluid dos not substantially change depending on the positions of the low speed leaf valves and the main valve.

With the aforesaid configuration, this invention may have the following actions.

At the fine slow speed range when the low speed leaf valve is extended, the leaf valve is gradually flexed and evenly supported along the gradually tapered or curved surface of the valve stopper. Fluid flows past the low speed leaf valve and into the intermediate chamber. There the fluid flows through the orifices of the main valve. At intermediate and high speed ranges, the low speed leaf valve is flexed in the same manner as described above and the fluid presses against the full upstream side of the main valve. This causes the main valve to be opened by an amount in which a set load of the spring is balanced with a flow rate. In this case, since the main valve can be floated freely and the area in contact with the fluid does not substantially change, there is no influence of any inertia of the valve other than the set load of the spring and the main valve can open smoothly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
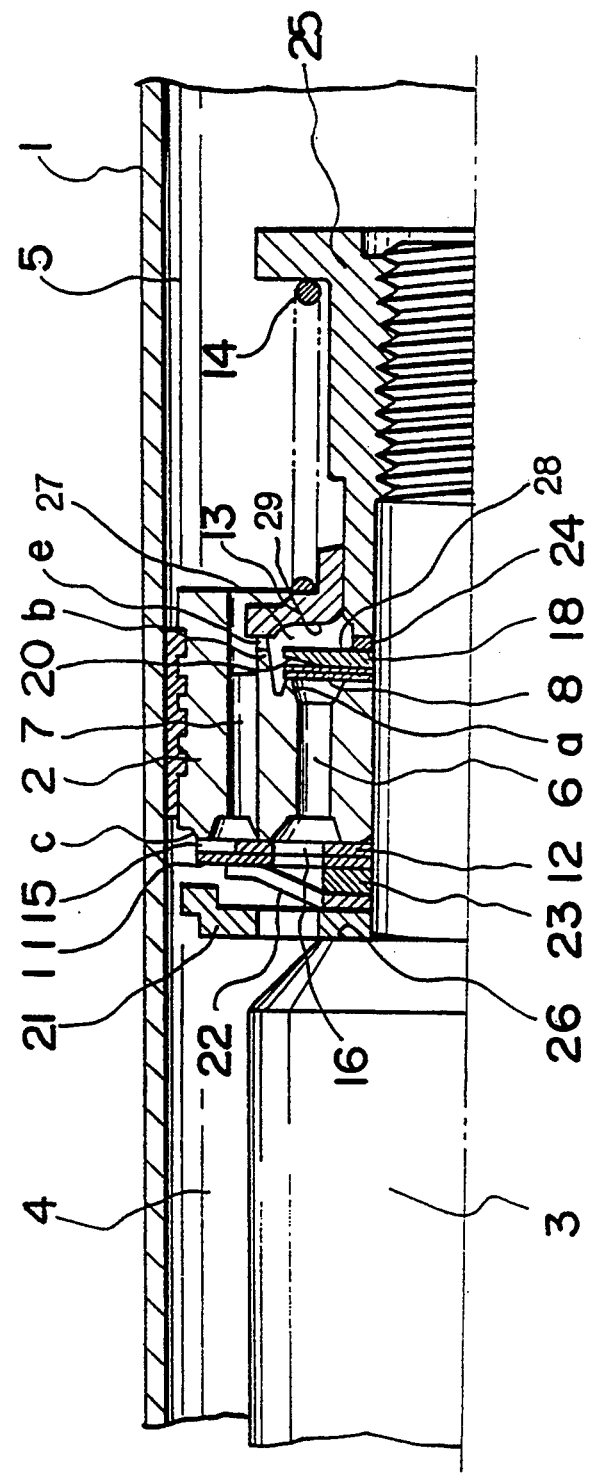
FIG. 1 is a longitudinal front elevational view in section for showing a piston part and a valve part of a hydraulic damper of one preferred embodiment of this invention.

Referring now to the drawings, the preferred embodiments of this invention will be described.

FIG. 1 shows one preferred embodiment of this invention.

A piston rod 3 is movably inserted into a cylinder 1 via a piston 2 of a partition wall member, the piston 2 defines the two upper and lower hydraulic chambers 4 and 5 within the cylinder 1. The two hydraulic chambers 4 and 5 are communicated to each other through an extension port 6 and a compression port 7 arranged in the piston 2.

Although an example of the piston acting as the partition wall member is disclosed, it is apparent that for example, a valve body of the base valve and other valve mechanisms may be applied.

Below the piston rod 3, inserted in series, are a valve stopper 21, a spring 22, an intermediate seat 23, compression side leaf valves 11 and 12, the piston 2, an extension leaf valve 8, a valve stopper 18, an intermediate seat 24 and a nut 25. The nut 25 is threadably fastened to hold the valve assembly between a stepped part 26 and the nut 25.

An outlet end of the extension port 6 is provided with seats (a) and (b) having different step heights. The seat (a) having a low height and a small diameter is provided with a fine low speed leaf valve 8 in such a way as it may be opened or closed. The seat part (b), having a large diameter and a higher height or farther downstream from the seat (a), is formed with an orifice (e) and the main valve 13 is oppositely abutted against the seat part (b) in such a way for the main valve 13 to be opened or closed.

An outlet end of the port 7 is provided with a leaf valve 12 having a cutout 15 and a port 16 in such a way as the port 7 may be opened or closed via the seat (c) and the leaf valve 12 is always pushed by a spring 22 in a closing direction.

A low speed valve stopper 18 is provided with at its upper surface a gradually and continuously tapered or curved surface 20, as shown in FIG. 7, directed outwardly. The inner circumference of the valve stopper 18 may support a base end of the leaf valve 8. When the leaf valve 8 is flexed downwardly, the tapered or curved surface 20 may guide the leaf valve 8 so as to gradually bend the low speed leaf valve 8 and evenly support the low speed leaf valve 8 when the low speed leaf valve is fully flexed. This dampens the stress in the low speed leaf valve 8 and assures hydraulic oil passage. The leaf valve 8 and seat (a) form a low damping valve means which is open at slow speed movements of the piston.

The main valve 13 is arranged along an outer circumference of the nut 25 in such a way as it may be axially floated up and down. The main valve 13 is biased by the spring 14 from its lower surface and pushed toward the seat (b). The main valve 13 and seat (b) form a high speed damping valve means, which is open only at high speed or strong movement of the piston. The main valve 13 and the outer seat (b) are spaced from the low speed valve stopper 18 in the downstream direction. This spacing is such that an intermediate chamber 27 is formed between a downstream side 28 of the valve stopper 18 and an upstream side 29 of the main valve 13. This intermediate chamber 27 brings the force of the fluid passing low speed leaf valve in to contact with a substantially constant sized portion of the downstream side 29 of the main valve 13, which does not substantially change in dependence on the positions of the low speed leaf valve 8 and the main valve 13.

As one can see from the drawings the valve stopper 18 extends radially from the piston rod 3 by an amount substantially equal to an amount the leaf valve 8 radially extends from the piston rod 3. The valve stopper 18 which is fixed, thus blocks the leaf valve 8 from contacting the main valve 13 when the leaf valve 8 flexes.

When the hydraulic damper is extended, hydraulic oil in the upper hydraulic chamber 4 may flow out partly from the port 6 in a fine slow speed range of piston movement, while gradually and continuously flexing the leaf valve 8, into the intermediate chamber 27, through the orifice (e) and partly flow from the recess 15 of the leaf valve 12 into the lower hydraulic chamber 5 through the port 7. Thus a complex attenuation force is caused by the flexing of the leaf valve 8 as well as the orifice (e) and the cutout 15.

At the intermediate and high speed range of the piston movement, when a speed of the piston is increased, the leaf valve 8 is again gradually and evenly flexed, and as a flow rate of the hydraulic oil is balanced with a set load of the spring 14, the main valve 13 descends to cause a space between it and the seat (b) to be opened. Then a composite attenuation force caused by a flowing resistance of the port 6 as well as the leaf valve 8 and the main valve 13 is produced.

When compressed, the hydraulic oil in the lower hydraulic chamber 5 pushes open the leaf valves 11 and 12 through the port 7 so as to produce a compressed side attenuation force by the leaf valves 11 and 12. In addition, during compression, as composite attenuation force having one attenuation force generated by the lower base valve (not shown) and the other attenuation force described above may be attained.

Figure 2:
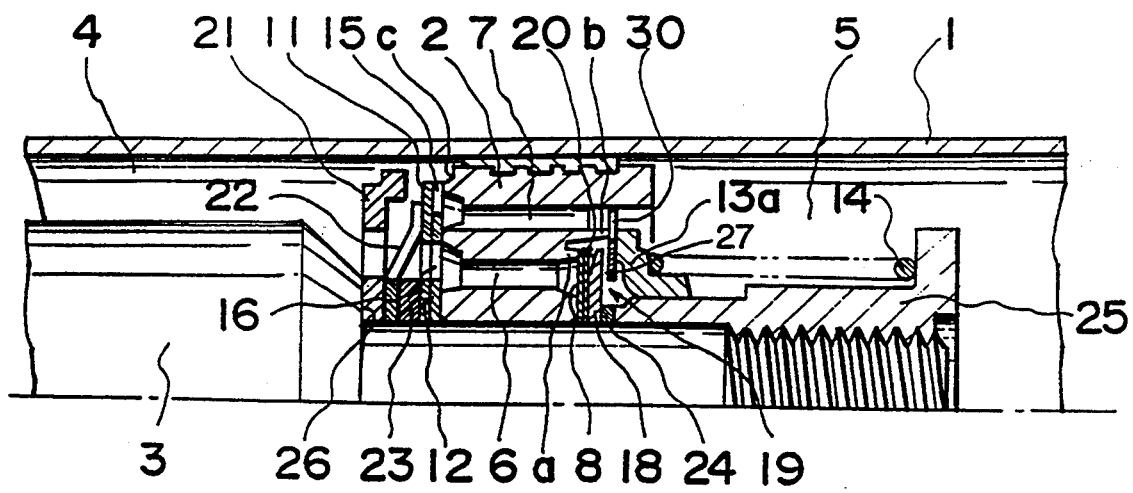
FIG. 2 is a longitudinal front elevational view in section for showing a piston part and a valve part of a hydraulic damper of another preferred embodiment of this invention.
Figure 3:
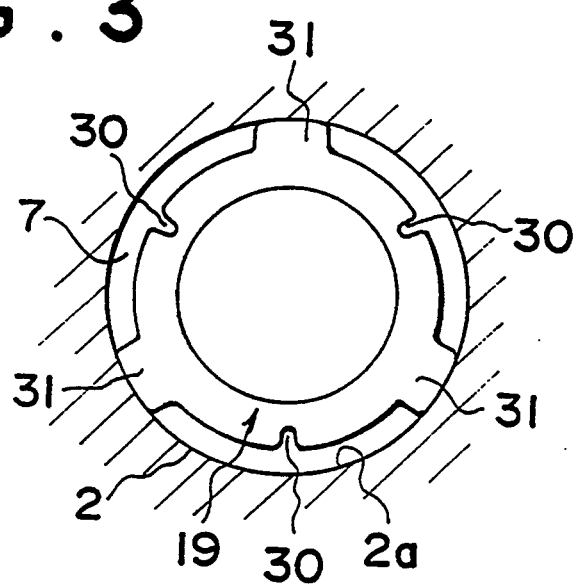
FIG. 3 is an enlarged top plan view for showing a cutout leaf valve.

FIGS. 2 and 3 illustrate a still further preferred embodiment of this invention.

This preferred embodiment is constructed such that a cutout main leaf valve 19 is used as a main valve and the cutout main leaf valve 19 is floated while being guided at its outer circumference. The cutout main leaf valve 19 is biased toward the closed position by the valve stopper 13a and the spring 14. Other structures are the same as that of the preferred embodiment shown in FIG. 1, so that their details will be eliminated by applying the same reference symbols.

An outlet end of the port 6 is provided with the seats (a) and (b) having different heights or spacing downstream to each other. The seat (a) having a small diameter is provided with a fine low speed leaf valve 8 in such a way as it may be opened or closed and the seat (b) having a large diameter has a cutout main leaf valve 19 of the main valve abutted thereagainst.

An outlet end of the port 7 is provided with leaf valves 11 and 12 having a cutout 15 through the seat (c) in such a way as they may be opened or closed, and they are always biased toward their closing direction.

The valve stopper 18 is formed at its upper surface with the gradual and evenly tapered or curved surface 20 directed outwardly and downwardly. An inner circumference of the valve stopper 18 may support a base end of the leaf valve 8, and when the leaf valve 8 is flexed downwardly the tapered or curved surface 20 gradually and evenly supports the leaf valve 8 so as to dampen the stress and assure the hydraulic oil passage.

A curve of the tapered surface 20 is formed in reference to a stress limiting point for preventing a crack of the leaf valve 8 and to a final angle for assuring the hydraulic oil passage.

As shown in FIG. 2, the cutout leaf valve 19 is made such that a plurality of cutouts 30 are spaced apart as orifices. An outer circumference of the cutout leaf valve is provided with a plurality of guide pieces 31 and the guide pieces 31 are slidably contacted with an inner circumference 2a of a skirt part of the piston 2.

The cutout main leaf valve 19 is arranged in such a way as it may be floated up and down while being guided by the inner circumference 2a of the skirt part of the piston 2. Its upper surface is supported by the seat (b), and its lower surface is supported by the valve stopper 13a biased by the spring 14.

When extended, the hydraulic oil in the upper hydraulic oil chamber 4 partly flows out into the lower hydraulic oil chamber 5 through the cutouts 30 while flexing the leaf valve 8 and opening it at a fine low speed range. A part of the hydraulic oil flows from the cutout 15 of the leaf valve 12 to the lower hydraulic oil chamber 5 through the port 7 and then an attenuation force combined by these oils is generated. The cutout 15 may be eliminated.

At the intermediate and high speed range where a speed of the piston is increased, the flow rate of the oil is increased and the leaf valve 8 is flexed. When the flow rate of the oil and the set load of the spring 14 are balanced, the cutout main leaf valve 19 descends to open a space between it and the seat (b). Then an attenuation force composed of a flowing resistance of the extension port 6 and the flexing of the lead valve 8 and the cutout main leaf valve 19 is generated.

When compressed, the hydraulic oil in the lower hydraulic chamber 5 pushes open the leaf valves 11 and 12 through the compression port 7 so as to generate the compression attenuation force caused by the leaf valves 11 and 12.

Figure 4:
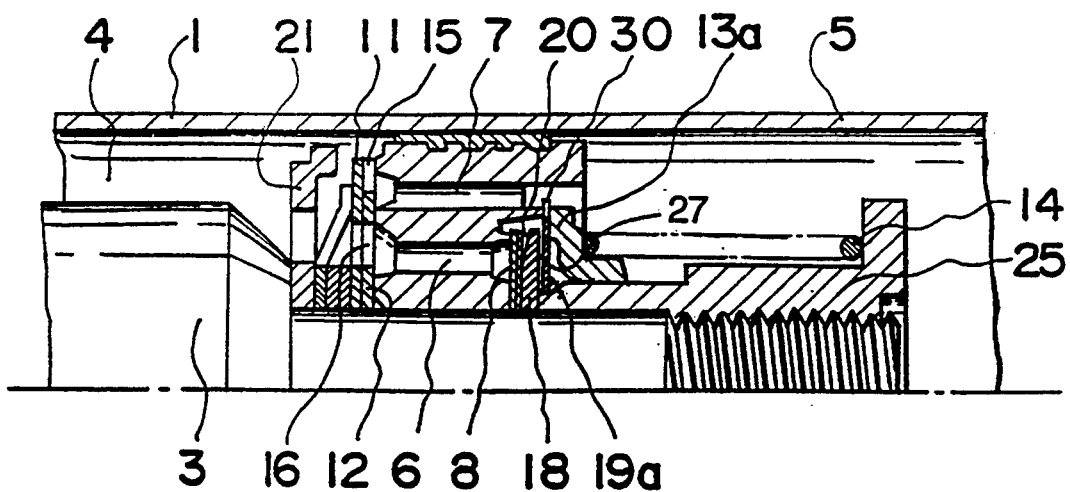
FIGS. 4 and 5 are longitudinal front elevational views in section for showing a piston part and a valve part of the hydraulic damper constructed similarly in accordance with another preferred embodiment.
Figure 6:
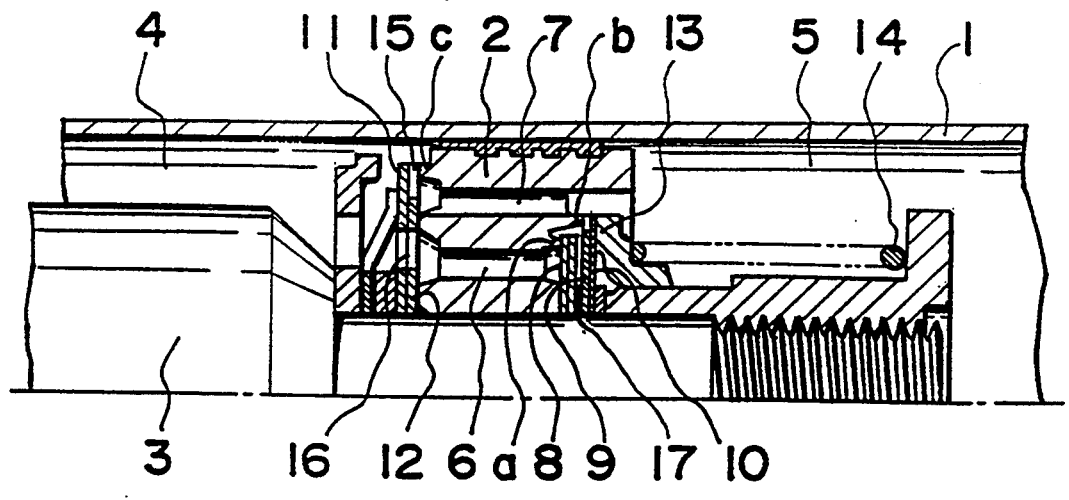
FIG. 6 is a longitudinal front elevational view partly in section for showing a prior art hydraulic damper.
Figure 5:
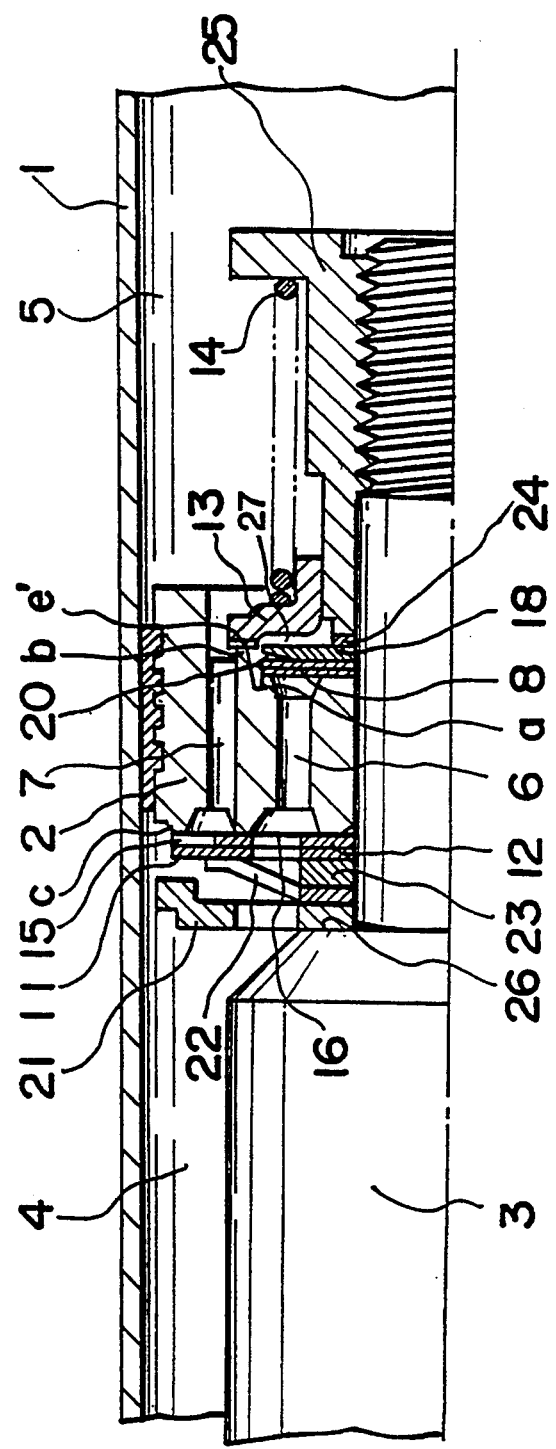

In case that the aforesaid valve mechanism is applied in a base valve, the leaf valve 8 and the sub-leaf valve 19 are operated when compressed. FIG. 4 shows another preferred embodiment of this invention of an inner circumferential guide type in which the cutout main leaf valve 19a is slidably contacted with the outer circumference of the nut 25. Other configurations actions and effects of this preferred embodiment are the same as those of FIG. 2. Similarly, FIG. 5 shows another preferred embodiment of this invention, wherein the preferred embodiment shown in FIG. 1 is modified. The upper surface of the main valve 13 is formed with an orifice (e') and it is abutted against the outer seat (b) through the upper surface having this orifice (e') in such a way as it may be moved to or away from it. The actions and effects of this preferred embodiment are the same as those of the embodiment in FIG. 1.

According to this invention, the following effects can be attained.

1. Since the main valve is arranged in series with a low speed damping valve means, and as it is movable in an axial direction, the set load of the main valve is only an inertia force of the spring and it may not be influenced by other inertia forces of other valves and then an attenuation force is stabilized.
2. The low speed leaf valve is supported by the valve stopper provided with the gradually tapered or curved surface and its flexing is gradually carried out along the tapered or curved surface, so that a stress is not locally concentrated but any crack of the leaf valve can be prevented.
3. The main valve is smoothly and evenly opened due to the fluid contact area of the main valve being substantially constant during all positions of the low speed leaf valve and the main valve.

While specific embodiments of the invention have been shown and described in detail to illustrate the application of the principles of the invention, it will be understood that the invention may be embodied otherwise without departing from such principles.

What is claimed is:
1. A hydraulic damper comprising:
a cylinder;
a fluid in said cylinder;

a piston movable in said cylinder and forming with said cylinder a first chamber and a second chamber, said piston defining a port having first and second outlets in said first and second chambers respectively, said fluid in said cylinder communicating between said first and second chambers through said port, said first outlet having an inner seat and an outer seat, said inner seat and said outer seat being arranged in series with said fluid communicating between said first and second chamber;

low speed damper means for damping low speed movements of said piston in said cylinder, said low speed damper means having a leaf valve having an extremity end operating in cooperation with said inner seat, said leaf valve having a base end abutted by a valve stopper with a continuously curved surface, said curved surface and said extremity end of said leaf valve defining a clearance, said clearance having a size to cause said leaf valve to flex during said low speed movements, said curved surface having a shape to substantially evenly support said leaf valve when said leaf valve is fully flexed; and a main valve having sliding means for sliding said main valve substantially axially into contact with and away from said outer seat during high speed movements of said piston, said sliding means also for controlling fluid flow between said first and second chambers by said sliding of said main valve, and said sliding means for damping high speed movements of said piston by said controlling of fluid, an upstream side of said main valve and a downstream of said valve stopper being spaced apart to define an intermediate chamber.

2. A damper in accordance with claim 1, wherein:
said sliding means has a spring means for biasing said main valve against said outer seat.

3. A damper in accordance with claim 1, further comprising:
a piston rod connected to said piston;
a nut attached to one end of said piston rod; and
said main valve defines an inner opening, and a circumference of said inner opening and said nut forming said sliding means.

4. A damper in accordance with claim 1, further comprising:
a piston rod connected to said piston; and
said main valve is shaped as a separate disk element and defines an inner opening, said piston rod passes through said inner opening, and a circumference of said inner opening slides against said piston rod.

5. A damper in accordance with claim 1, wherein:
said outer seat protrudes further into said first chamber than said inner seat.

6. A damper in accordance with claim 1, further comprising:
a piston rod connected to said piston; and
said main valve defines an inner opening, said piston rod passes through said inner opening of said main valve, a circumference of a said inner opening and said piston rod forming said sliding means for sliding said main valve into contact with and away from said outer seat.

7. A damper in accordance with claim 6, wherein:
said sliding means has a spring means for biasing said main valve against said outer seat, and said spring means has a coil spring around said piston rod.

8. A damper in accordance with claim 1, wherein:
said main valve includes a separate disk element with a guide piece on an outer circumference of said disk element; and
said piston has a guide surface means adjacent said outer seat for guiding said disk in an axial direction, said guide piece sliding along said guide surface means.

9. A damper in accordance with claim 8, further comprising:
a piston rod connected to said piston; and
said disk defines an inner opening, said piston rod passes through said inner opening and a circumference of said inner opening is spaced from said piston rod.

10. A damper in accordance with claim 1, wherein:
said outer seat and said main valve define an orifice for fluid flow between said outer seat and main valve when said main valve is against said outer seat.

11. A damper in accordance with claim 10, wherein:
said outer seat has a cutout to partially define said orifice.

12. A damper in accordance with claim 10, wherein:
said main valve has a cutout to partially define said orifice.

13. A damper in accordance with claim 1, wherein:
said main valve is formed as a separate disk element and positioned between said sliding means and said outer seat.

14. A damper in accordance with claim 13, wherein:
said outer seat and said main valve define an orifice for fluid flow between said outer seat and said main valve when said main valve is slid against said outer seat.

15. A damper in accordance with claim 14, wherein:
said main valve has a cutout to partially define said orifice.

16. A damper in accordance with claim 1, wherein:
said curved surface of said valve stopper gradually curves from one end to another end to gradually bend said leaf valve during opening of said leaf valve.

17. A hydraulic damper comprising:
a cylinder;
a fluid in said cylinder;
a piston movable in said cylinder and forming with said cylinder a first chamber and a second chamber, said piston defining a port having first and second outlets in said first and second chambers respectively, said fluid in said cylinder communicating between said first and second chambers through said port, said first outlet having an inner seat and an outer seat, said inner seat and said outer seat being arranged in series with said fluid communicating between said first and second chamber;
low speed damper means for damping low speed movements of said piston in said cylinder, said low speed damper means having a leaf valve operating in cooperation with said inner seat, said leaf valve being supported by a valve stopper with a crowed surface, said valve stopper being fixed and nonmovable with respect to said piston;
a main valve having sliding means for sliding said main valve substantially axially into contact with and away from said outer seat during high speed movements of said piston, said sliding means also for controlling fluid flow between said first and second chambers by said sliding of said main, valve, and said sliding means for damping high speed movements of said piston by said controlling of fluid, an upstream side of said main valve and a downstream side of said valve stopper being spaced apart to define an intermediate chamber.

18. A damper in accordance with claim 17, wherein:
said intermediate chamber exposes a substantially constant portion of said downstream side of said main valve to the fluid independently of positions of said leaf valve and said main valve.

19. A damper in accordance with claim 17, wherein:
said valve stopper has a size and is positioned to block said leaf valve from contacting said main valve when said leaf valve flexes during high speed movements of said piston.

20. A hydraulic damper comprising:
a cylinder;
a fluid in said cylinder;
a piston movable in said cylinder and forming with said cylinder a first chamber and a second chamber, said piston defining a port having first and second outlets in said first and second chambers respectively, said fluid in said cylinder communicating between said first and second chambers through said port, said first outlet having an inner seat and an outer seat, said inner seat and said outer seat being arranged in series with said fluid communicating between said first and second chamber;
low speed damper means for damping low speed movements of said piston in said cylinder, said low speed damper means having an inner seat and a leaf valve operating in cooperation with said inner seat, said leaf valve being supported by a valve stopper with a curved surface, said valve stopper being fixed and non-movable with respect to said piston, said curved surface having a shape to substantially evenly support said leaf valve when said leaf valve is fully flexed;
a main valve defining an inner opening and having sliding means for sliding said main valve substantially axially into contact with and away from said outer seat during high speed movements of said piston, said sliding means having a spring means for biasing said main valve against said outer seat, said sliding means also for controlling fluid flow between said first and second chambers by said sliding of said main valve, and said sliding means damping high speed movements of said piston by said controlling of fluid, said outer seat and said main valve are positioned spaced in a downstream direction from a downstream side of said valve stopper of said leaf valve, an upstream side of said main valve and said downstream side of said valve stopper being spaced apart to define an intermediate chamber;
a piston rod connected to said piston; and
a nut attached to one end of said piston rod, said nut clamping said leaf valve and said valve stopper between said nut and said piston, a circumference of said inner opening of said main valve and said nut forming said sliding means, said spring means including a coil spring positioned between one end of said nut and said main valve.

* * * * *